(12) United States Patent
Gro (10) Patent No.: US 8,571,183 B2
(45) Date of Patent: Oct. 29, 2013

(54) TOOL FOR TESTING DISTRIBUTION CABINETS OF A TELEPHONE NETWORK

(75) Inventor: Fabio Gro, Rome (IT)

(73) Assignee: Telecom Italia S.p.A., Milan (IT)

( * ) Notice: Subject to any disclaimer, the term of this patent is extended or adjusted under 35 U.S.C. 154(b) by 66 days.

(21) Appl. No.: 13/257,469

(22) PCT Filed: Mar. 19, 2009

(86) PCT No.: PCT/EP2009/053226
§ 371 (c)(1),
(2), (4) Date: Sep. 19, 2011

(87) PCT Pub. No.: WO2010/105681
PCT Pub. Date: Sep. 23, 2010

(65) Prior Publication Data
US 2012/0008750 A1    Jan. 12, 2012

(51) Int. Cl.
*H04M 1/24* (2006.01)
*H04M 3/08* (2006.01)
*H04M 3/22* (2006.01)

(52) U.S. Cl.
USPC ................................. 379/21; 379/27.07

(58) Field of Classification Search
USPC .................. 379/19, 21, 26.01, 27.07
See application file for complete search history.

(56) References Cited

U.S. PATENT DOCUMENTS

| 5,432,705 A | 7/1995 | Severt et al. | |
| 6,438,212 B1 * | 8/2002 | Lysaght et al. | 379/21 |
| 6,917,595 B2 * | 7/2005 | Chang et al. | 370/248 |
| 7,283,617 B2 * | 10/2007 | Brumble | 379/21 |
| 2001/0009576 A1 * | 7/2001 | Avitsur et al. | 379/29.01 |

FOREIGN PATENT DOCUMENTS

| FR | 2547140 A1 | 12/1984 |
| WO | 97/10666 A1 | 3/1997 |
| WO | 98/47273 A1 | 10/1998 |

OTHER PUBLICATIONS

International Search Report dtd Nov. 27, 2009, PCT/EP2009/053226.

* cited by examiner

*Primary Examiner* — Quoc D Tran
(74) *Attorney, Agent, or Firm* — Banner & Witcoff, Ltd.

(57) ABSTRACT

An apparatus such as a tool for testing lines at a network distribution cabinet allows the connection to the network of subscriber twisted pairs. The apparatus includes inputs for the connection of probes adapted to contact pairs of connection terminals of the distribution cabinet for the connection of the subscriber twisted pairs; a line test unit adapted to perform tests on the lines under the control of a programmable control unit; at least one memory for storing the results of the tests. The control unit is adapted to automatically perform a test of the lines terminating at the distribution cabinet according to a predetermined sequence, and to store the results of the test in a structured form in which a unique association is established between a physical position of each pair of terminal clamps in the distribution cabinet and the results of the test conducted on the corresponding lines.

13 Claims, 5 Drawing Sheets

| TERMINAL CLAMP PAIR # | LINE TYPE | TEST RESULTS |
|---|---|---|
| DISTRIBUTION CABINET x | | |
| ... | ... | ... |
| DISTRIBUTION CABINET y | | |
| ... | ... | ... |

FIG. 6

TOOL FOR TESTING DISTRIBUTION CABINETS OF A TELEPHONE NETWORK

CROSS REFERENCE TO RELATED APPLICATIONS

This is a U.S. National Phase Application under 35 U.S.C. §371 of International Application No. PCT/EP2009/053226, filed Mar. 19, 2009, which was published Under PCT Article 21(2), the entire contents of which are incorporated herein by reference.

BACKGROUND OF THE INVENTION

1. Field of the Invention

The present invention broadly relates to the field of telecommunications, and more specifically to telephone networks, particularly fixed (wired) telephone networks.

2. Description of the Related Art

Wired telephone networks (also referred to as PSTN—Public Switched Telephone Networks) comprise, in their "last mile loop" that reaches the end users (subscribers of the telephony operator), distribution cabinets where the twisted pairs that lead to the subscribers' premises are attached to the cables that reach the telephone network core apparatuses, like for example the switching centrals.

These distribution cabinets are typically located along the streets pathways, in correspondence of the buildings where the subscribers' premises (e.g., apartments, offices) are located, or in the buildings' basements.

A distribution cabinet allows the connection of several different subscribers' twisted pairs, e.g. in a number of 10. In a typical PSTN, several hundred thousands of such distribution cabinets are necessary to bring the telephony services to the subscribers.

Testing and maintenance operations need to be periodically performed by qualified technicians of the network operator, for example in order to fix any possible malfunctioning reported by the subscribers. These operations often involve the distribution cabinets, which have to be accessed by the technicians to perform tests and controls on the different twisted pairs.

Accession to the distribution cabinets is also required for assessing which subscriber lines have already been assigned to subscribers, and which lines are instead free, for the identification (e.g., in terms of telephone number) of the different subscriber lines available in the generic distribution cabinet, for assessing the nature of the different telephone lines available in the distribution cabinet (e.g., plain old telephone line, ISDN—Integrated Service Digital Network—line, ADSL—Asymmetric Digital Subscriber Line). The information derivable from the field by the technicians are quite important to allow the telephony operator build and keep constantly updated a databank which provides a reliable view of the current telephone network status.

A consolidated practice adopted by the technicians for performing tests on the subscriber lines available in a distribution cabinet provides for them calling a colleague at a central of the telephone network using a selected one of the lines reaching the cabinet, and asking him/her to report the CLI (Calling Line Identity) associated with that line.

In WO 97/10666 a centralized test apparatus is provided for a telecommunications network which includes local switches and a core network. Each local switch is connected through terminating lines to terminating equipment such as telephone handsets. The test apparatus forms a centralized test apparatus for the whole network, and is implemented as a computer. The test apparatus enables a field engineer to obtain the identity of a terminating line from one of the local switches. When a field engineer dials the number of the test apparatus, the test apparatus retrieves the CLI on answering the call. It then transmits the CLI in speech form back to the calling line. After transmitting the CLI, the test apparatus offers a menu of further services which comprise a ring back service and the provision of a test tone on a specified telephone line.

In WO 98/47273, a similar centralized test apparatus is provided. The test apparatus is connected to the centralized database which contains routing tables for terminating lines of the access networks of the public telecommunications network. The test apparatus enables a field engineer to record routing data in the centralized database. When a field engineer connects a telephone instrument to a terminating line in a node in an access network, the engineer can dial the number of the test apparatus. The test apparatus retrieves the CLI on answering the call. It then invites the field engineer to enter an identifier for the type of node, the number of the node and the number of a terminal inside the node through which the terminating line passes. The CLI, the type of node, the number of the node and the number of the terminal are then used to update routing data in the database.

SUMMARY OF THE INVENTION

The Applicant believes that the conventional techniques for testing distribution cabinets of a telephony network are far from being satisfactory.

For example, the provision of a centralized test apparatus as disclosed in WO 97/10666 and WO 98/47273 has an impact on the structure of the core network, a thing that is believed to be undesirable.

The known methodologies and systems are particularly inadequate or scarcely effective in respect of operations of exhaustive testing of all the subscriber lines of a distribution cabinet. In particular, the Applicant observes that when an exhaustive testing of a distribution cabinet is to be accomplished, the technicians may have to manually write down the correspondence between subscriber lines tested and the results of the tests, in order to subsequently use the results of the test to, e.g., update a central database of the telecom operator. This operation is burdensome, time-consuming and prone to errors.

The Applicant believes that it would be very useful to provide technicians operating in the field with a portable, handheld tool to be used for performing different tests on the telephone lines available in a distribution cabinet.

In particular, the Applicant found that it would be very useful to provide for the possibility of accomplishing the exhaustive testing of distribution cabinets in a structured form, and to store the test results in a structured way, so that the correspondence between the various subscriber lines tested and the results of the test are more easily and rapidly used for updating a central database.

According to an aspect of the present invention, there is provided a tool for testing telephone lines at a telephone network distribution cabinet allowing the connection to the telephone network of a plurality of subscriber twisted pairs, the tool comprising:

inputs for the connection of probes adapted to contact pairs of connection terminals of the distribution cabinet for the connection of the plurality of subscriber twisted pairs;

a telephone line test unit adapted to perform tests on the telephone lines under the control of a programmable control unit;

at least one memory for storing the results of the tests, wherein the control unit is adapted to automatically perform a test of the telephone lines terminating at the distribution cabinet according to a predetermined sequence, and to store the results of the test in a form in which a unique association is established between a physical position of each pair of terminal clamps in the distribution cabinet and the results of the test conducted on the corresponding telephone lines.

The tool preferably comprises a display for displaying to a tool user indications of the sequence of pairs of terminal clamps to be contacted by the tool probes.

The tool may comprise a mobile telephony unit and a telephone circuit adapted to place a call over a telephone line being tested to a mobile telephony number assigned to the mobile telephony unit, the mobile telephony unit being adapted to receive the placed call and to extract a Calling Line Identity CLI associated to the telephone line.

The Calling Line Identity CLI may be displayed on the display.

The telephone line test unit may comprise a Point-to-Point Protocol PPP client capable of setting up a connection with a DSLAM in the telephone network, sending a pre-defined User Id and password and receiving from the DSLAM an authentication message, containing a subscriber profile and identification.

The telephone line test unit may be capable of testing an Integrated Service Digital Network ISDN line by checking a switching voltage and its balance with respect to ground.

The telephone line test unit may be capable of testing a 2 Mbit PCM line, by checking the presence of a prescribed supply voltage, and checking the presence of repeaters.

The tool may comprise an interface for downloading the stored test results.

Said interface may comprise the mobile telephony unit.

The stored results of the test are preferably arranged by distribution cabinet.

The downloaded stored test results may be used to automatically update a telephone network database containing data of the distribution cabinets.

Another aspect of the invention relates to a tool for testing wired telephone lines at a telephone network distribution cabinet allowing the connection to the telephone network of a plurality of subscriber twisted pairs, the tool comprising:

inputs for the connection of probes adapted to contact pairs of connection terminals of the distribution cabinet for the connection of the plurality of subscriber twisted pairs, and embedded in the tool, a mobile telephony unit and a telephone circuit, the telephone circuit being adapted to place a call over a telephone wired line being tested to a mobile telephony number assigned to the mobile telephony unit embedded in the tool, and the mobile telephony unit being adapted to receive the call placed over the wired telephone line by the telephone circuit and to extract a Calling Line Identity CLI associated to the telephone line. The Calling Line Identity CLI may be displayed on the display.

BRIEF DESCRIPTION OF THE DRAWINGS

These and other features and advantages of the present invention will be made apparent by the following detailed description of some exemplary and non-limitative embodiments thereof, description that, for best intelligibility, should be read in conjunction with the attached drawings, wherein.

DETAILED DESCRIPTION OF EMBODIMENTS OF THE INVENTION

Figure 1:
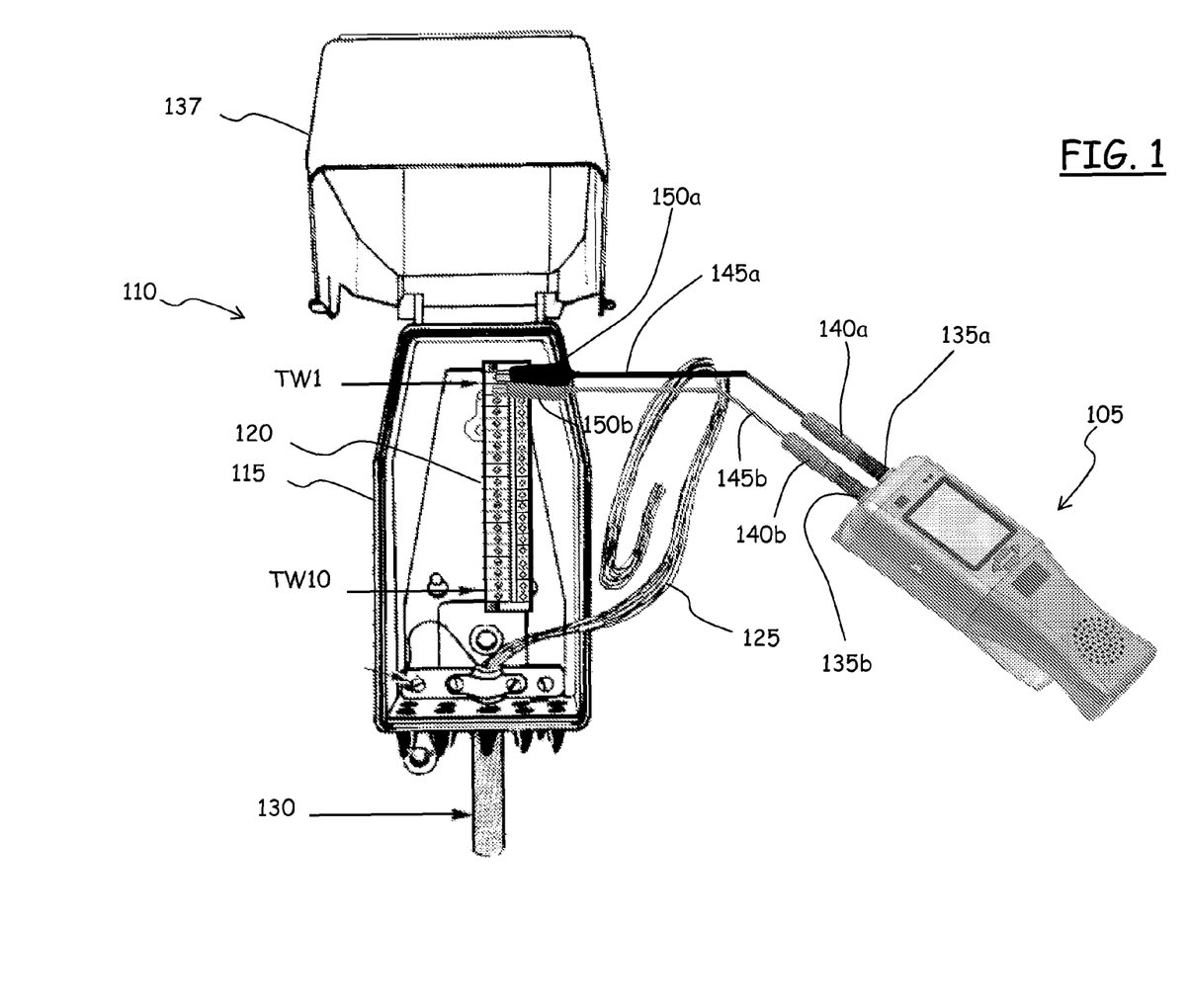
FIG. 1 pictorially shows a tool according to an embodiment of the present invention for testing a telephone network distribution cabinet.

Making reference to the drawings, in FIG. 1 there is pictorially shown a tool 105 according to an embodiment of the present invention for testing a telephone network distribution cabinet 110.

The distribution cabinet 110 is one of the many distribution cabinets that a wired telephone network typically comprises and at which twisted pairs that lead to the subscribers' premises are attached to the network infrastructure (e.g., to switching centrals). The distribution cabinet 110 may for example be located along a street pathway, corresponding to a building where the subscribers' premises (e.g., apartments, offices) are located, or in the building's basement.

The distribution cabinet 110 allows the connection of several different subscribers' twisted pairs, e.g. in a number of 10, as in the example shown; however, distribution cabinets exist allowing the connection of a different number of twisted pairs, particularly higher than 10.

The distribution cabinet 110 essentially comprises a housing 115, for example a plastic box, accommodating a terminal block 120 comprising a plurality, 10 in the shown example, of pairs of terminal clamps TW1-TW10 for the connection of ends of respective subscribers' twisted pairs (not shown in the drawing for not complicating it), and of corresponding pairs of wires 125 that, through a cable 130, are connected to the telephone network infrastructure (e.g., to telephone switching centrals). A cover 137 is provided to close the housing 115.

The tool 105 according to an embodiment of the present invention is a handheld instrument that has two terminals 135a, 135b, provided with connection bushes for the connection of jacks 140a, 140b at an end of two conductor cables 145a, 145b which, at their opposite ends, are provided with clamps 150a, 150b adapted to be removably attached to the pairs of terminal clamps TW1-TW10. In alternative embodiments of the present invention (as for example shown in FIG. 2), the tool 105 may be provided with a pair of probes, instead of the bushes for the connection of the jacks 140a, 140b, the probes being adapted to contact pairs of terminal clamps TW1-TW10 (in still alternative embodiments of the invention, the probes may be an accessory that is insertable into the bushes of the two terminals 135a, 135b).

Figure 2:
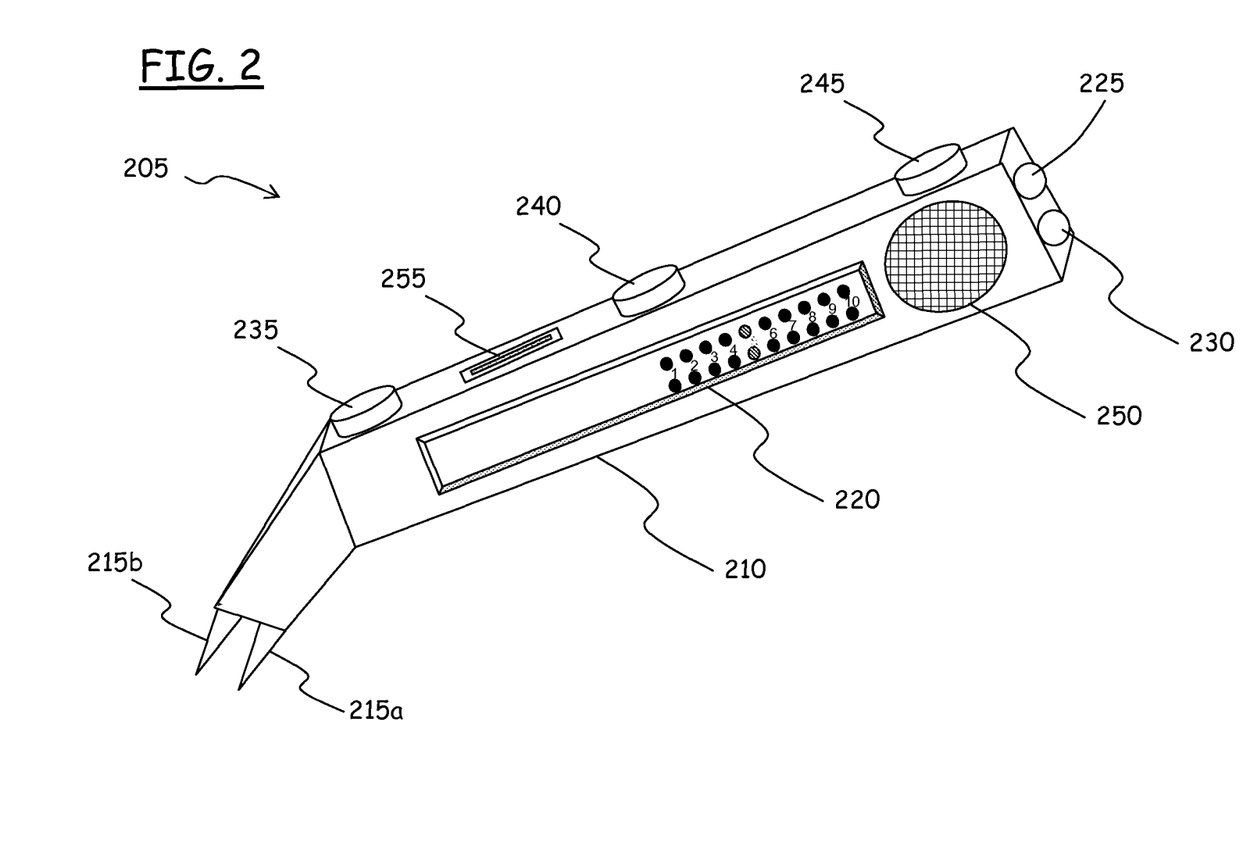
FIG. 2 depicts schematically but in greater detail a tool according to an embodiment of the present invention.

In FIG. 2 there is pictorially shown, schematically but in greater detail, a tool 205 according to an embodiment of the present invention. The tool 205 comprises a casing 210 of size and shape adapted to be held in a hand of a technician (the casing 210 is depicted as generally rectangular only for the sake of simplicity, other shapes being possible). In the considered example, the casing 210 has a pair of probes 215a, 215b for contacting couples of terminal clamps TW1-TW10 in the terminal block 120 of the distribution cabinet 110. The tool 205 has a man-machine interface for the interaction with the technician using it; the man-machine interface comprises for example a display 220 for displaying to the technician relevant information during the testing of the distribution cabinet 110, indicators 225, 230, for example LEDs (preferably of different colors), used for signaling to the technician the nature of a tested telephone line (for example, one LED is used to signal that a tested line is a plain old telephone line, whereas the other may be used to signal that the tested line is an ADSL line), and buttons for allowing the technician inputting commands, for example a button 235 for instructing the tool 205 to start a procedure of testing of a telephone line or of the whole distribution cabinet 110, a button 240 for instructing the tool 205 to perform an alignment with the telephone line carrier to define the states of carrier line (Conversation state or not) and to start a procedure of scouting of a communication protocol active over tested line, and a button 245 for instructing the tool 205 to place a telephone call (e.g., in order to get information about the number corresponding to a telephone line). The tool 205 may further comprise a loudspeaker 250, useful to let the technician ear telephone line signal tones emitted by a central when testing a telephone line, and an input/output interface port 255, e.g. a USB port.

Figure 3:
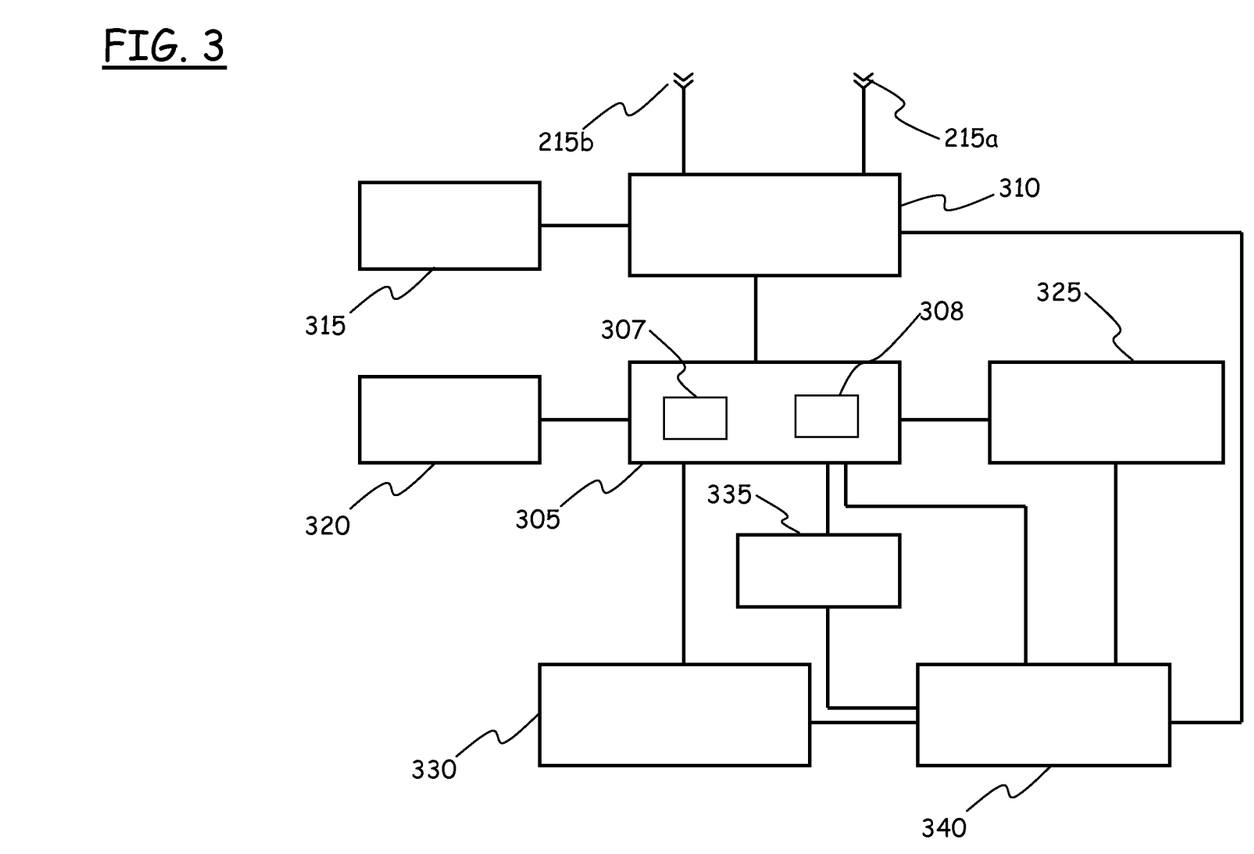
FIG. 3 is a schematic block diagram showing the main components of the tool of FIG. 2, in an embodiment of the present invention.

FIG. 3 presents a schematic block diagram with the main functional blocks of the tool 205, according to an embodiment of the present invention. The whole operation of the tool 205 is governed by a programmable processing unit 305, for example a microprocessor or a microcontroller, having memory resources, particularly a non-volatile memory 307 (like a ROM, an EPROM, an EEPROM, a Flash memory) for storing the microprocessor/microcontroller program code and data, and a volatile memory 308 (like a RAM, particularly a DRAM and/or a static RAM) used as a working memory.

A front-end block 310 schematizes the front-end circuitry for performing the test to identify the telephone lines by electronic measures. Considering for example the plain old telephone network services, the front-end block 310 can test a line by checking the nominal voltage power plant, checking the free/occupied switching tone, checking the power on a busy line and checking the noise line level. The types of tests that the tool 205 may be adapted to carry out will be described in greater detail later on. Coupled to the front-end block 310 is a telephone circuit 315 adapted to place telephone calls over the wired telephone network.

Blocks 320 and 325 respectively schematize the input and output parts of the man-machine interface, namely the buttons 235, 240 and 245, and the display 220 and LED indicators 225, 230.

The tool 205 further comprises a USB interface 330, coupled to the USB port 255, and a mobile telephony unit 335, e.g. a GSM/GPRS/UMTS unit, allowing the tool 205 to place/receive calls through a mobile, cellular telephone network, and preferably to send/receive data.

A power management unit 340 supplies power to all the parts of the tool 205; the power management unit 340 may comprises a battery, preferably a rechargeable lithium battery.

According to an embodiment of the present invention, exploiting the tool 205 a technician can test telephone lines reaching the distribution cabinet 110. In particular, different types of tests can be performed, depending on the nature of the telephone lines.

For example, for a plain old telephone line the tool 205 may be adapted to check the nominal line voltage, the line free/busy switching tones, the line electrical power when the line is busy, the line noise level, the degree of insulation between the pair of line cables and between the cable wires and the ground. Using the telephone circuit 315, the tool 205 can place a telephone call over the line being tested; the telephone call is in particular placed to the mobile telephony number assigned to the SIM (Subscriber Identity Module) associated with the mobile telephony unit 335 of the tool 205, so that the call is received by the tool 205 and the telephone number assigned to the tested line (the CLI—Calling Line Identity) is displayed on the display 220 of the tool.

For an ISDN (Integrated Service Digital Network) line the tool 205 may be adapted to check the switching voltage and its balance with respect to ground.

For an ADSL line, the tool 205 may be adapted to check the presence of the service, analyzing the presence of repeaters in the DSLAM (Digital Subscriber Line Access Multiplexer) located in the network switching central, and to analyze and measure the ADSL line according to the characteristics of the associated DSLAM. The tool 205 is also preferably equipped with a PPP (Point-to-Point Protocol) client used to set up a connection with the DSLAM. The tool 205 performs the detection of the analysed subscriber line by sending a predefined User Id and password and receiving an authentication message, containing the subscriber profile and identification.

For other types of telephone lines, like for example a 2 Mbit PCM line, the tool 205 may be adapted to check the presence of the prescribed supply voltage, and to check the presence of repeaters.

While conducting the test of the telephone line, the tool 205 is adapted to display to the technician relevant information, on the display 220; for example, when checking the line voltages (whose values depend on the nature of the telephone line tested), the tool 205 is adapted to compare the measured values with predetermined benchmarks (whose values are stored in the non-volatile memory of the tool 205) and to display the result to the technician, possibly indicating mismatches.

The results of the tests performed on the telephone lines are stored in the non-volatile memory 307 of the tool 205, and the stored test results can be viewed on the display 220, as well as downloaded through the USB port 255 or via mobile telephone network, using the mobile telephony unit 335.

According to an embodiment of the present invention, the tool 205 is adapted to perform an automatic, exhaustive test of all the telephone lines terminating at the distribution cabinet 110.

Figure 4:
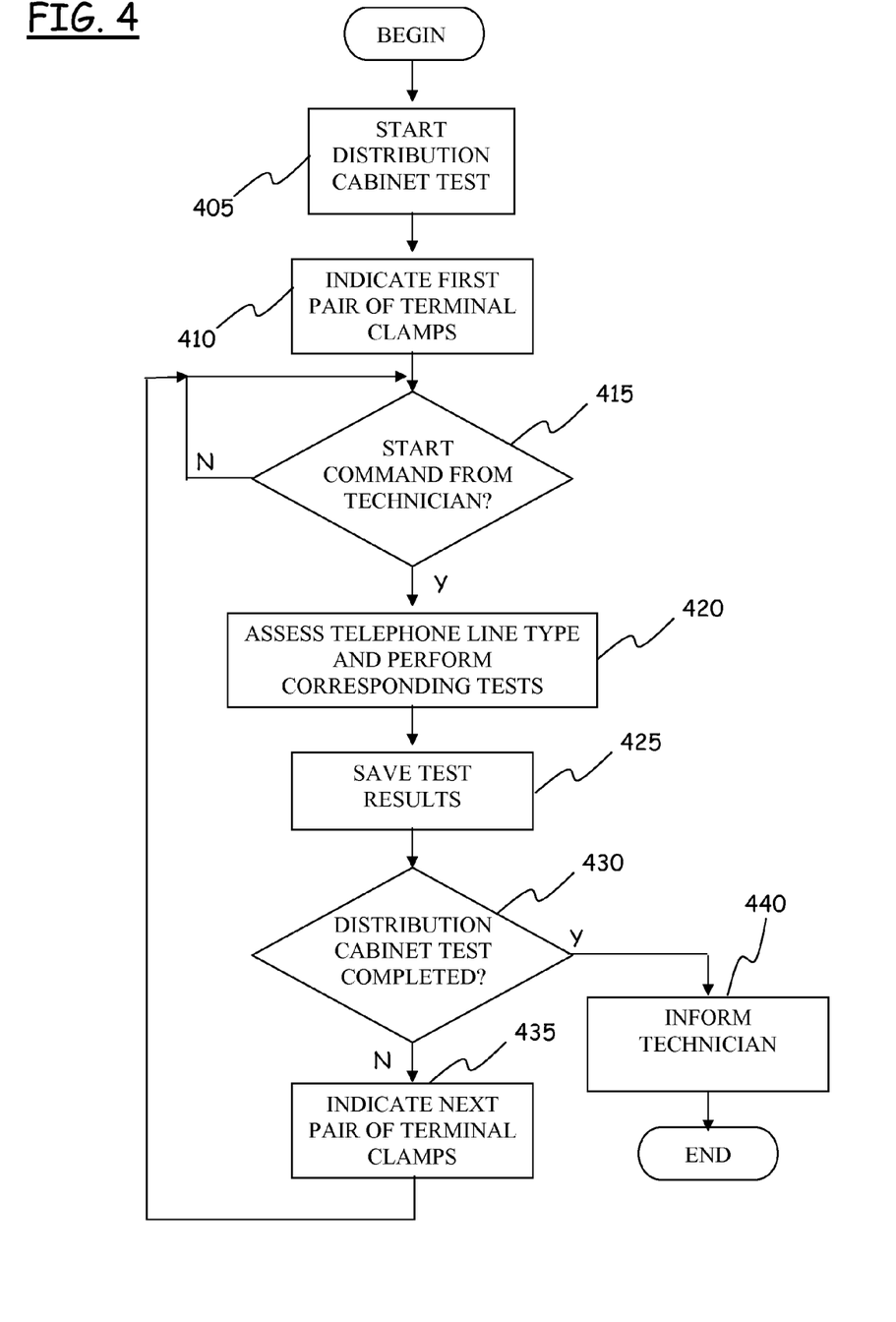
FIG. 4 is a schematic flowchart of an automatic distribution cabinet testing method performed by using the tool according to an embodiment of the present invention.

In particular, referring to the schematic flowchart of FIG. 4, the automatic distribution cabinet testing procedure according to an embodiment of the present invention, which may be started by the technician pushing one of the buttons of the tool, for example the button 235 (block 405), may provide for having the tool 205 instructing the technician to progressively put the tool probes 215a, 215b on the different pairs of terminal clamps TW1-TW10 of the distribution cabinet 110, according to a predetermined order, so as to test the various telephone lines reaching the distribution cabinet according to said predetermined order; the tool 205 may instruct the technician by displaying the instructions on the display 220; to this purpose, a graphic representation of the terminal block 120 of the distribution cabinet 110 may be displayed on the display 220, and the set of pairs of terminal clamps TW1-TW10, and the specific pair of terminal clamps TW1-TW10 corresponding to the telephone line to be tested may be highlighted; in alternative or in addition, the loudspeaker 250 may be exploited to provide guidance to the technician. In alternative embodiments of the invention, the testing sequence of the different telephone lines may be already known by the technician, and the tool does not have to instruct the technician, simply informing him/her when the test of a given telephone line has been completed, and it is possible to pass to the following telephone line to be tested.

After the automatic test procedure is entered, the tool 205 indicates to the technician the first pair of terminal clamps TW1-TW10 to be tested (block 410). Then, the tool 205 waits for a start command from the technician (block 415). The technician places the probes of the tool onto the indicated pair of terminal clamps TW1-TW10, and instructs the tool 205 to start the testing, for example pushing the button 235.

When the start command is entered (block 415, branch Y), the tool 205 starts performing the test of the telephone line corresponding to the selected pair of terminal clamps TW1-TW10 (block 420); the testing is performed automatically: the tool 205 is adapted to automatically assess the nature of the telephone line (e.g., plain old telephone line, ISDN line, ADSL line, 2 Mbit PCM line, etc.), and, based on the assessed nature of the line, to perform specific tests, as described in the foregoing.

The results of the tests conducted on the selected telephone line are stored by the tool 205 (block 425), e.g. the non-volatile memory 307 thereof.

When the test of the selected telephone line is completed, and until there are other telephone lines to be tested (block 430 exit N) the tool 205 instructs the technician to move to the next pair of terminal clamps TW1-TW10 in the testing sequence (block 435). The technician places the probes of the tool on the indicated pair of terminal clamps TW1-TW10, and starts the test. The above operations are repeated.

When all the telephone lines reaching the distribution cabinet 110 have been tested (block 430 exit Y), the tool 205 may inform the technician of the completion of the test (block 440).

Figure 5:
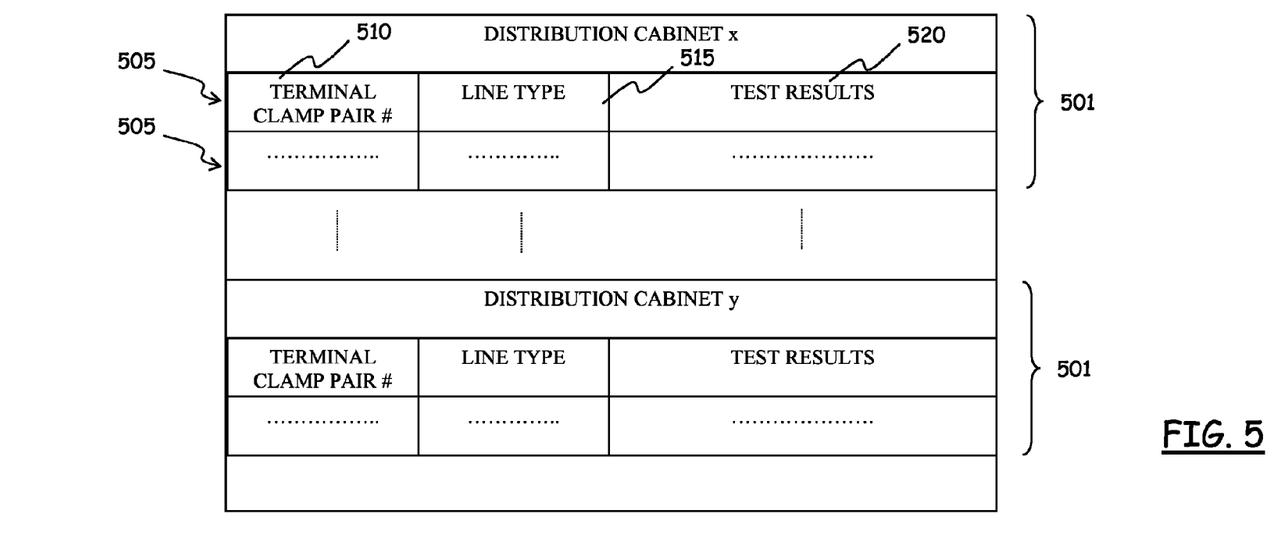
FIG. 5 schematically shows a structure of a database of distribution cabinet test results built by the tool according to an embodiment of the present invention.

In the memory 307 of the tool 205 the test results are preferably stored in a structured form. For example, as schematically depicted in FIG. 5, a database may be kept including a record 501 for each distribution cabinet tested ("DISTRIBUTION CABINET x", "DISTRIBUTION CABINET y", . . . ); the generic distribution cabinet may be identified by a unique identifier assigned thereto by the telephone network operator. For each distribution cabinet, a number of database entries 505 are provided, each one corresponding to a respective pair of terminal clamps TW1-TW10. The generic entry 505 comprises a field 510 adapted to store an identifier of the pair of terminal clamps, a field 515 adapted to store an identifier of the nature of the telephone line terminating thereat, and one or more fields 515 adapted to store the results of the tests conducted on such telephone line (which depend as discussed earlier on the nature of the telephone line). Thus, a unique association between the physical position of each pair of twisted pairs terminal clamps TW1-TW10 in the distribution cabinet 110 and the nature and characteristics of the corresponding telephone line is established.

Figure 6:
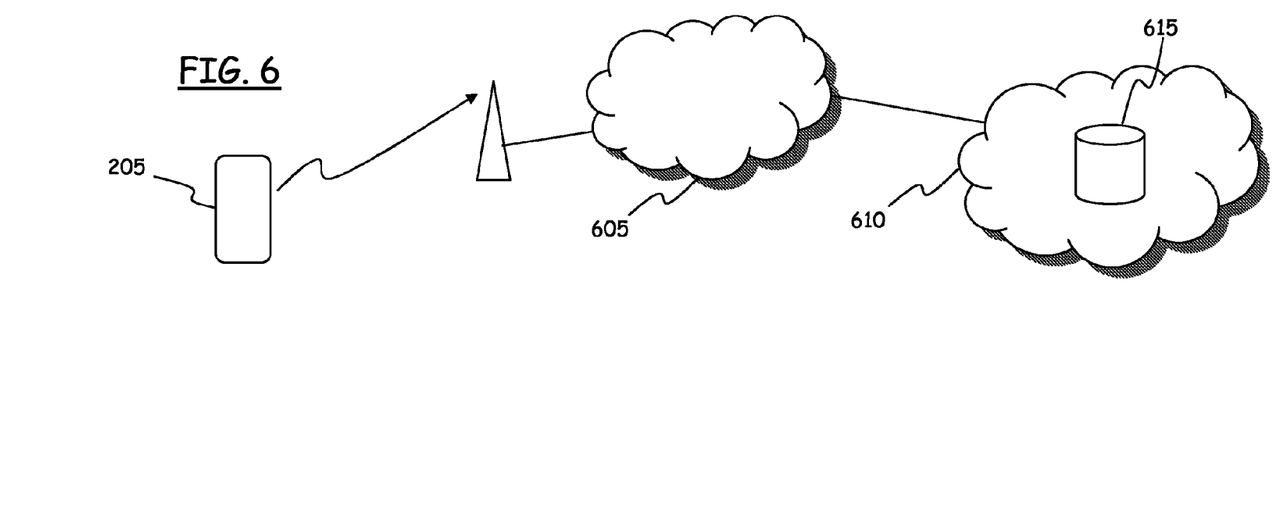
FIG. 6 depicts a download phase of the test results from the tool to a telephone network operator for updating a network database.

As pictorially shown in FIG. 6, the data stored in the database and relating to the tests conducted on the distribution cabinets on the field can be uploaded, via a mobile telephony network like a GSM/GPRS/UMTS network 605, to a management central 610 of the telephone network operator, where they are used to update a telephone network database 615 containing data adapted to describe the current telephone network status. In addition or in alternative, the test results may be downloaded exploiting the USB port 255.

The tool according to the present invention is a low-cost instrument that is easy to use and greatly facilitates and speeds up the operations that technicians have to perform for testing telephone lines at distribution cabinets. A distinctive advantage of the tool according to the present invention is that it does not require any modification to the telephone network infrastructure.

The present invention has been here described making reference to some embodiments thereof. Several changes to the described embodiments, as well as other embodiments of the present invention are possible, without departing from the scope of the appended claims.

The invention claimed is:

1. An apparatus for testing communication lines, the apparatus comprising:
   inputs for connection of probes configured to contact pairs of connection terminals of a distribution cabinet for the connection of a plurality of subscriber twisted pairs;
   a programmable control unit;
   a communication line test unit adapted to perform tests on the communication lines under the control of the programmable control unit;
   at least one memory for storing the results of the tests;
   a display configured to display user indications of a predetermined sequence of pairs of connection terminals to be contacted by the probes,
   wherein the control unit is configured to:
      perform a test of the communication lines terminating at the distribution cabinet according to the predetermined sequence, and
      store the results of the test in a form in which a unique association is established between a physical position of each pair of connection terminals in the distribution cabinet and the results of the test conducted on the communication lines corresponding to each pair of connection terminals.

2. The apparatus of claim 1, comprising a mobile communication unit and a communication circuit configured to place a call over a communication line being tested to a mobile communication number assigned to the mobile communication unit, the mobile communication unit being configured to receive the placed call and to extract a Calling Line Identity corresponding to the communication line.

3. The apparatus of claim 2, wherein the Calling Line Identity is displayed on the display.

4. The apparatus of claim 1, wherein the communication line test unit comprises a Point-to-Point Protocol client configured to set up a connection with a DSLAM in a communication network, send a pre-defined User ID and password and receive from the DSLAM an authentication message containing a subscriber profile and identification.

5. The apparatus of claim 1, wherein the communication line test unit is configured to test an Integrated Service Digital Network line by checking a switching voltage and its balance with respect to ground.

6. The apparatus of claim 1, wherein the communication line test unit is configured to test a 2 Mbit PCM line, by checking for presence of a prescribed supply voltage, and checking for presence of repeaters.

7. The apparatus of claim 1, comprising an interface configured to download the stored test results.

8. The apparatus of claim 7, wherein said interface comprises a mobile communication unit and a communication circuit configured to place a call over a communication line being tested to a mobile communication number assigned to the mobile communication unit, the mobile communication unit being configured to receive the placed call and to extract a Calling Line Identity corresponding to the communication line.

9. The apparatus of claim 1, wherein the stored results of the test are arranged by distribution cabinet.

10. The apparatus of claim 9 comprising an interface configured to download the stored test results, wherein the downloaded stored test results are used to automatically update a communication network database containing data of the distribution cabinets.

11. The apparatus of claim 1, wherein the predetermined sequence of pairs of connection terminals to be contacted by the probes comprises at least a first pair of connection terminals in the distribution cabinet and a second pair of connection terminals in the distribution cabinet, and wherein the display is configured to:
- display a first user indication to contact the first pair of connection terminals with the probes; and
- after display of the first user indication, display a second user indication to contact the second pair of connection terminals with the probes.

12. The apparatus of claim 11, wherein the second user indication is displayed after a test of the communication lines corresponding to the first pair of connection terminals is completed.

13. The apparatus of claim 1, wherein the display of the user indications of the predetermined sequence of pairs of connection terminals to be contacted by the probes comprises a display of a graphical representation of a terminal block of the distribution cabinet, wherein the terminal block provides access to the communication lines terminating at the distribution cabinet.

* * * * *